B. W. KING.
SCALE.
APPLICATION FILED NOV. 26, 1919.
1,416,719.
Patented May 23, 1922.
5 SHEETS—SHEET 2.
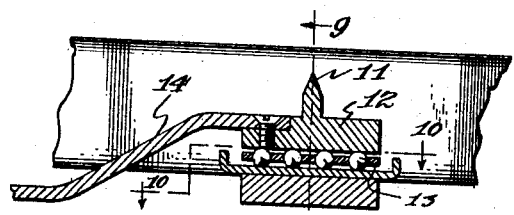
Fig. 8
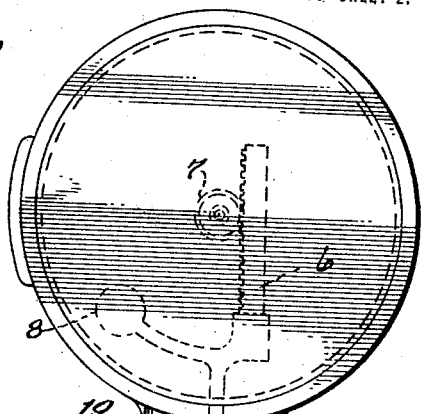
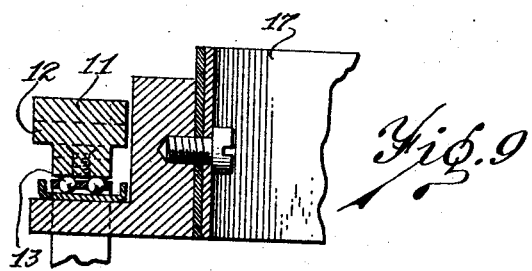
Fig. 9
Fig. 10
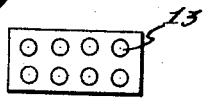
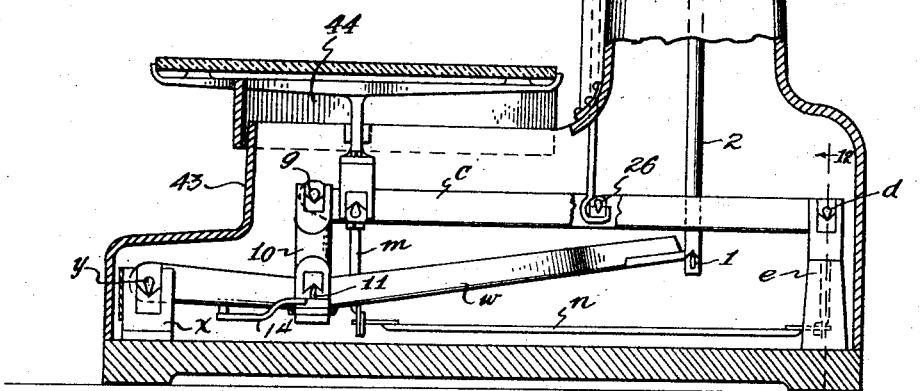
Fig. 3
Inventor
Bert W. King
By Stuart L. Barnes
Attorney

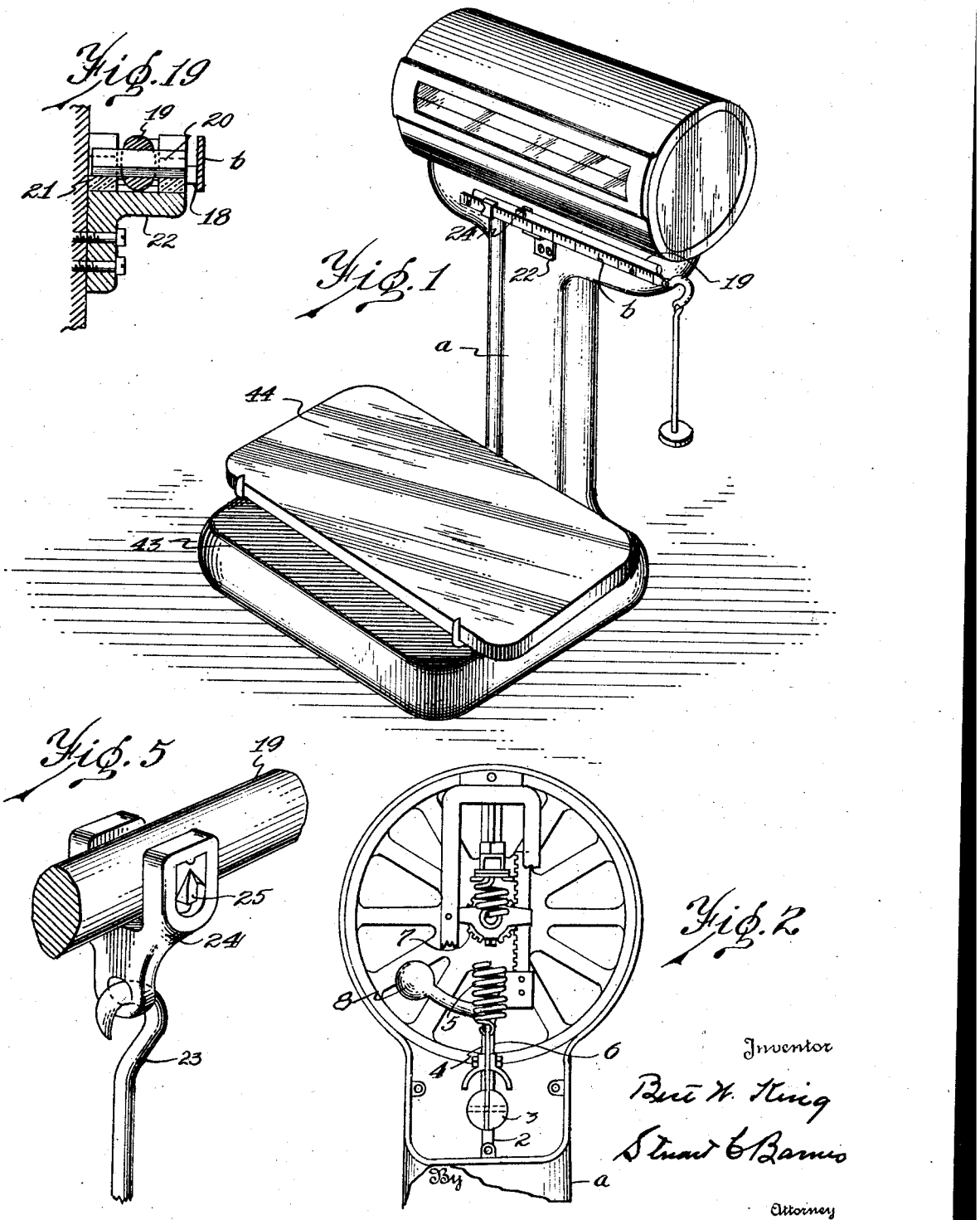

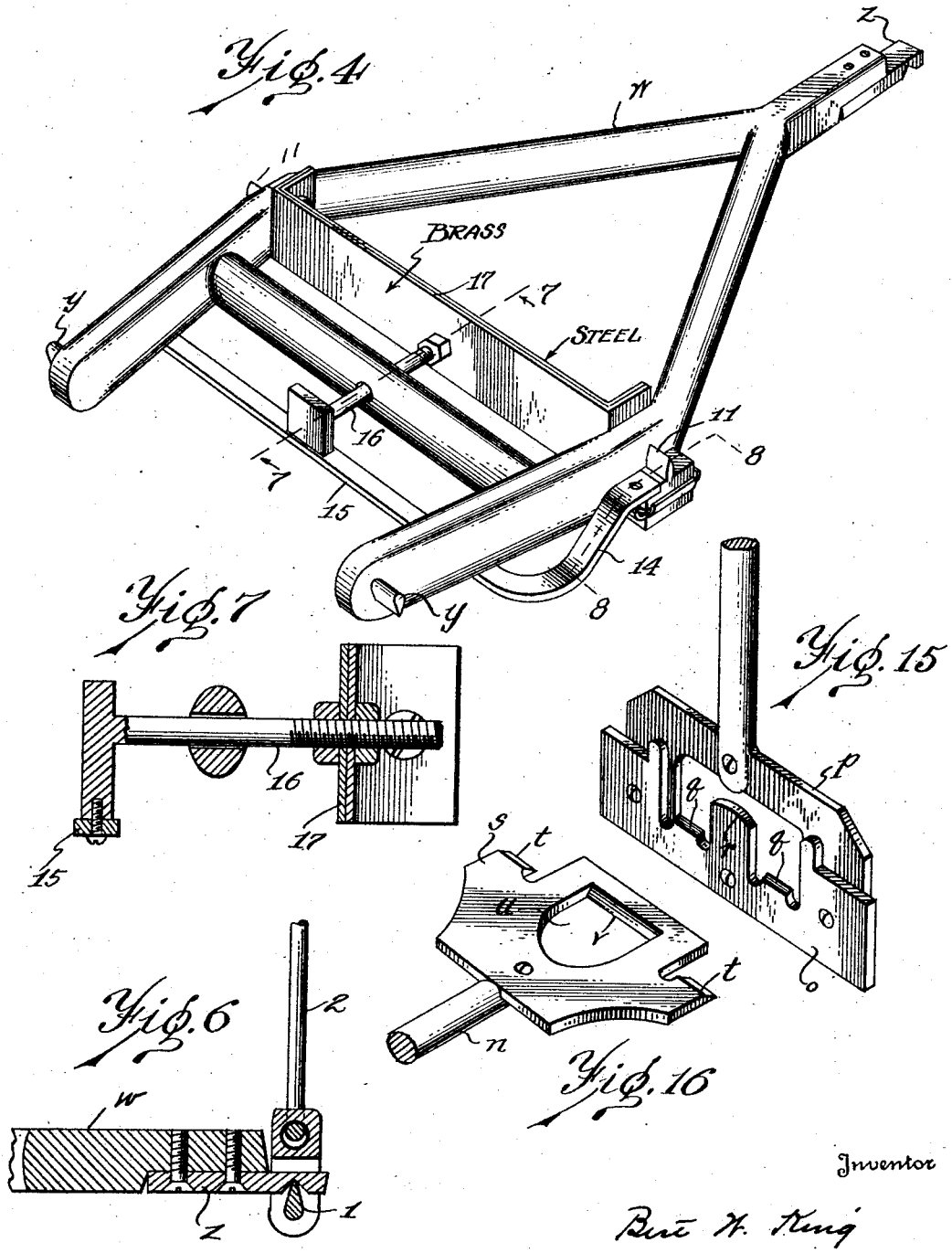

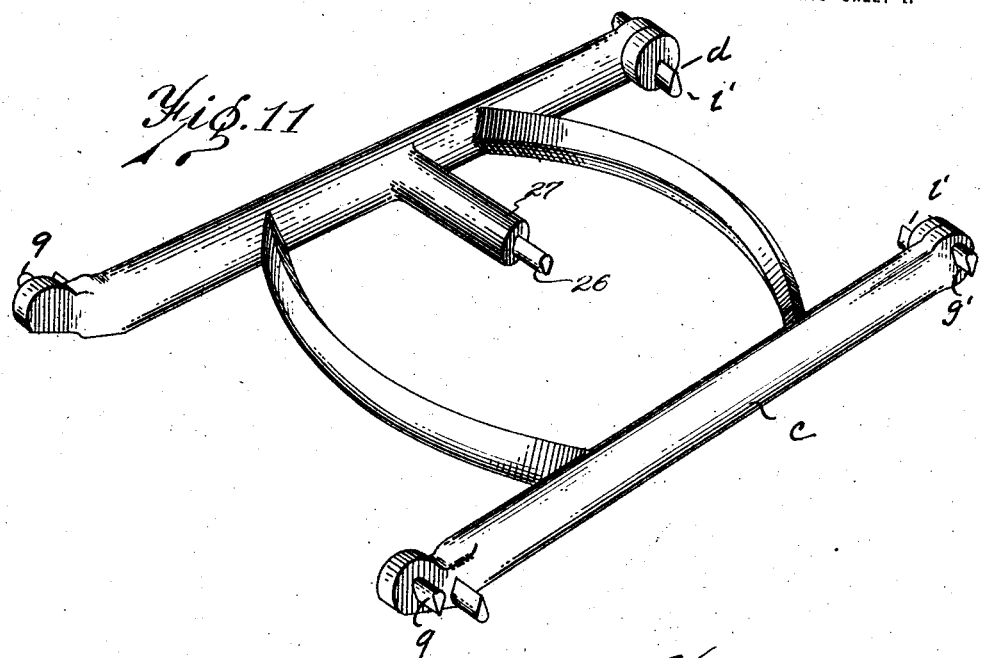
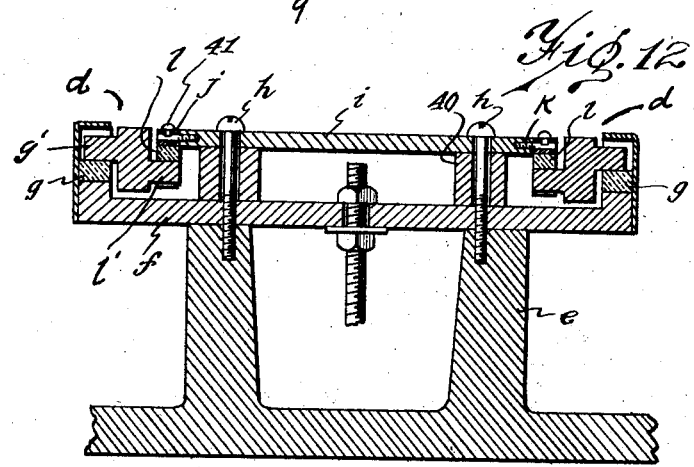
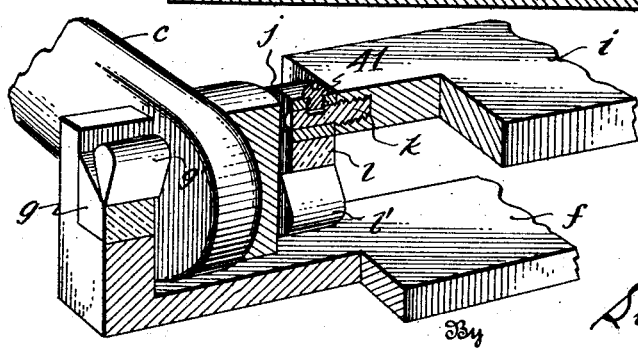

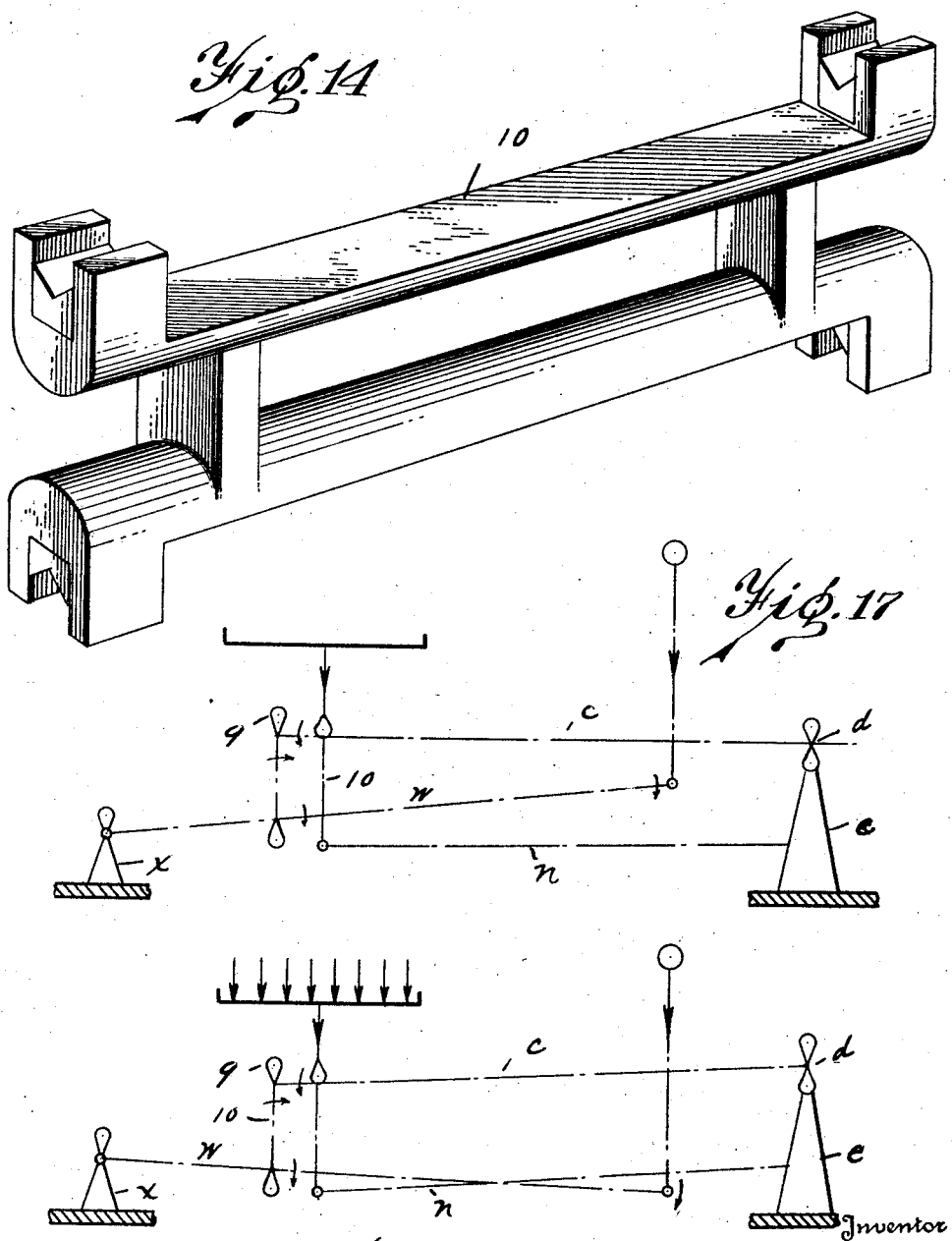

UNITED STATES PATENT OFFICE.

BERT W. KING, OF DETROIT, MICHIGAN.

SCALE.

1,416,719.  Specification of Letters Patent.  Patented May 23, 1922.

Application filed November 26, 1919. Serial No. 340,707.

*To all whom it may concern:*

Be it known that I, BERT W. KING, a citizen of the United States, residing at Detroit, in the county of Wayne and State of Michigan, have invented certain new and useful Improvements in Scales, of which the following is a specification.

This invention relates to automatic computing scales and has for its object a scale of this character that is provided with a special arrangement of levers including a multiplying lever of the third order and a load-carrying lever of the third order.

One of the special features of this scale is a double knife edge bearing for the load-carrying lever that does away with the usual counterweight, makes possible a short stem for the platform and hence a low platform, and further permits the use of a tare or extra-capacity beam which is connected directly with the load-carrying lever. Furthermore it greatly increases the reliability of the scale regardless of the position of the load upon the platform whether at the center or at the extreme edge.

A further improved feature in this scale is a simple but effective thermostatic arrangement for shifting the contact point of the push link upon the multiplying lever.

These features will be properly amplified as the specific structure is explained.

In the drawings,—

Fig. 1 is a perspective of the complete scale.

Fig. 2 is an end elevation of the cylindrical housing for the drum with the end plate removed and some of the parts broken away.

Fig. 3 is a side elevation of the scale with some of the casing broken away to show, in particular, the lever arrangement in side elevation.

Fig. 4 is a perspective of the main or multiplying lever including the thermostat.

Fig. 5 is a perspective detail showing the connection between the draw link and the tare lever.

Fig. 6 is a detail showing the connection between the main or multiplying lever and the draft rod.

Fig. 7 is a section taken on the line 7—7 of Fig. 4.

Fig. 8 is a section taken on the line 8—8 of Fig. 4.

Fig. 9 is a section taken on the line 9—9 of Fig. 8.

Fig. 10 is a plan view of the ball bearing shown in Figs. 8 and 9.

Fig. 11 is a perspective view of the load-carrying lever.

Fig. 12 is a section on the line 12—12 of Fig. 3.

Fig. 13 is an enlarged detail showing the double knife bearing for the load-carrying lever.

Fig. 14 is an enlarged perspective of the actuating link between the load-carrying lever and the multiplying or drum actuating lever.

Figs. 15 and 16 are details showing the hinging connection between the check lever and its support, and the check lever and the platform stem.

Figs. 17 and 18 are diagrammatic views showing the lever arrangement.

Fig. 19 is a section through the tare beam and support.

The housing and the main features of the scale are shown in Fig. 1. The base is relatively low, made possible by the double knife edge bearing for the load-carrying lever that will be more fully explained hereinafter. The pedestal of the scale is provided with a boss $a$ in which rises the draw link that operates the tare beam $b$.

Referring to Fig. 3, it will be seen that the load-carrying lever $c$ is a lever of the third order. It has a double knife edge bearing $d$ upon the posts $e$ at the rear of the machine. Referring to Figs. 12 and 13 the detail construction will be understood. The posts $e$ support a cross bar $f$, the ends of which are turned up and shaped to seat the agate bearings $g$ with the V groove. Also secured to the posts $e$ upon the spacers 40 by the screws $h$ is a second cross bar $i$ at the ends of which are secured the blocks $j$ by the screws $k$ and which carry the V groove agate blocks $l$. The V grooves in the blocks $g$ are upwardly facing and the V grooves in the blocks $l$ are downwardly facing and the bottom lines of the two grooves are in alignment. The block $j$ is held from moving endwise upon the screw $k$ by the set screw 41, but there is a slight clearance between the end of the set screw and the flat filed on the screw $k$ to permit a small swinging movement of the block to assure properly lining up with the block $g$.

The end of the load-carrying lever $c$ is formed into two bosses $g'$ and $l'$ having knife edges aligned, in $g'$, the edge at the bottom of the boss, and, in $l'$, the edge at the top of the boss. These engage the companionly designated agate bearings. Heretofore it has been customary to employ a counterweight on the end of the load-carrying lever to prevent the knife edge jumping out of the bearing or slipping up on the sides of the groove of the agate block. Where the load is placed near the edge of the platform it tends to cause the knife edge to climb the walls of the groove; in fact, they would actually climb the walls of the groove if it were not for the counterweight. This counterweight must be sufficiently heavy to perform its function at the maximum capacity of the machine. Hence there is always a dead load on the bearings, which tends to wear the knife edges prematurely. The counterweight also is objectionable as increasing the length of the base at the rear for obviously with a counterweight on the scale shown in Fig. 3, the base would have to be extended to the rear to accommodate it.

With my double knife edge bearing for the fulcrum of the load-carrying lever any tendency of the lower knife edge to climb the sides of the agate block groove is resisted by the upper knife edge engaging the inverted groove of the agate block $l$. Hence no counterweight is needed. Furthermore, with a counterweight the stem of the platform is usually required to be relatively long between the connection with the load-carrying lever and the check lever so as to diminish the leverage of an eccentrically placed load on the platform tending to displace the fulcrum of the load-carrying lever. Otherwise the counterweight would have to be objectionably heavy. With my double knife edge bearing a positive resistant of the tendency of the knife edge to climb the agate block groove is provided, and hence it makes little or no practical difference whether the leverage of the load placed on the edge of the platform is great or small. This enables me to construct a relatively thin base and a relatively low platform which is advantageous in a scale construction. Furthermore, excessive wear upon the knife edges due to carrying a dead weight is avoided. Still another advantage is that it permits the use of a tare beam connected directly to the load-carrying lever, which has been considered impracticable heretofore in barrel scales.

The stem $m$ of the platform, as indicated in Fig. 3, is relatively short. The bottom of this stem is connected to the check link $n$ by the knife bearing arrangement illustrated in Figs. 15 and 16. This consists of a loop-like plate $p$ on the bottom of the stem, to which is secured by screws a plate $o$ having knife edges $q$ and an upright lug $r$. A plate $s$ secured to the end of the check link $n$ is provided at the sides with knife edges $t$ adapted to engage against the plate $o$ just above the screws. The central opening $u$ enables the plate $s$ to be fitted over the upright lug $r$ of the plate $o$ and the opening $u$ is provided with a knife edge $v$ adapted to engage against the back of the upright lug $r$. This is an old construction and no claim of novelty is made for it. It is used at both the front and rear end of the check link. This check link operates in the customary way to keep the platform horizontal.

A multiplying or drum-actuating lever $w$ is pivoted in the blocks $x$ at the forward end of the base and provided with a suitable knife blade and agate bearings. This drum-actuating lever is shown in its entirety in perspective in Fig. 4. It comprises a sort of rough Y at the forward end provided with two knife edges $y$ and a rear end or stem having a steel bearing plate $z$ attached thereto provided with a V groove adapted to fit over the knife edge 1 suspended from the bottom of the draw link 2, which in turn is fastened to the equalizing beam 3 (Fig. 2). Inasmuch as such a fastening is an old construction and is in no way claimed, it is not detailed. This equalizing beam is provided at its ends with links 4 (Fig. 2) secured to the ends of the springs 5. The equalizing beam is also connected to the racks 6 which engage the pinion 7 that rotates the drum. A weight 8 serves to hold the rack to the pinion in the familiar way.

The movement of the load-carrying lever is communicated from the end of the load-carrying lever through the knife edge and agate bearing 9 and the compound link 10, detailed in perspective in Fig. 14, to the drum-actuating lever $w$. A shiftable knife edge 11 between the link 10 and lever $w$ is plainly shown in Fig. 4 and even more clearly detailed in Figs. 8 and 9. It comprises a knife edge carried as an integral part of the block 12 that is supported on the ball bearings 13 carried in the plate and having the edges of the sockets of the balls pinched over the balls. This shiftable block has an arm 14 secured thereto by a screw, and this arm 14 is part of the yoke 15 (shown in Fig. 4), which is shifted back and forth by the rod 16 that is secured to the center of the thermostatic strips 17. The ends of these thermostatic strips are folded at a right angle and screwed to the Y-like frame of the drum-actuating lever. The forward strip is brass; the rear strip is steel. Brass has a very much higher coefficient of expansion than steel. Obviously when the thermostat is subjected to higher temperature, the brass will expand faster than the steel and tend to bow the strip forward, pushing the rod 16 forward and the yoke 15 forward, thereby drawing the knife edges 11 forward and thereby altering the point of contact of the push link 10 with the drum-actuating lever. This will obviously lessen the throw of the drum-actuating lever for a given depression of the platform. Hence in warm weather when the spring expands and weakens, compensation is made for this by lessening the throw of the drum-actuating lever. It can be easily calculated what are the variations in ounces due to a given range of temperature which is customarily met with. It can also be determined what movement of the point of contact of link with drum-actuating lever will be necessary to make up for variation of indicated weight. It then can be determined experimentally how long a thermostat will be required to bow a distance sufficient to give the required movement of the said contact point. This thermostatic arrangement serves to accurately correct what would otherwise be an error in indications on the scale.

Now referring to Fig. 1, the graduated tare beam or extra-capacity beam is designated $b$. This tare or extra-capacity beam $b$ is bolted by the bolts 18 (Fig. 19) to the tare lever 19, which has a knife edge 20 engaging in the agate bearings 21 (Fig. 19) which are supported on the bracket 22 that is secured to the pedestal $a$ by screws. A short distance back of the pivot a draw bar 23 (Figs. 3 and 5) hooks into the connecting yoke 24 provided with agate bearings which engage the knife edges 25 of the tare beam. The lower end of this draw link 23 is provided with a hook carrying an agate bearing (Fig. 3) which is engaged by the knife edge 26 carried on the arm 27 (Fig. 11) projecting from one of the side bars of the load-carrying lever. This tare beam, which may also be used for an increased capacity beam, is made possible in the position shown and described by reason of the lever arrangement and the double knife bearing described in the first part of the specification.

The use of a lever of the third order as a load-carrying lever and a reversely placed lever of the third order as a drum-actuating or multiplying lever enables a very large multiplying ratio to be secured between the platform and the drum so as to make the movement of the platform relatively small for a given rotation of the drum. This is considered a distinct advantage in scales of this type. Furthermore, the lever arrangement in which the drum-actuating lever has a position reversed with respect to the load-carrying lever, permits the base of the scale to be formed as shown in Fig. 3, with the front of the base being recessed or stepped, so to speak, as at 43. This keeps the base as far away from the platform as possible, which is advantageous in case some overhanging object be placed upon the scale and which might otherwise strike against the base and introduce an error into the weighing. The platform is provided with an apron 44 that engages over the upstanding portion of the base and prevents anything getting into the interior of the housing and into the mechanism. This apron hangs down over the base at three sides. Furthermore, this lever arrangement permits of the use of a tare beam on a barrel type of scale, which has not been considered feasible heretofore. The tare beam can be connected up with the load-carrying lever at a point in front of the pedestal and this load-carrying lever has such a small movement at this point as not to result in objectionable movement of the tare beam, which is the case with nearly every other lever arrangement should the tare beam be coupled up at this point.

In the claims the words "drum-actuating lever" are used to designate the lever $w$, but these words are used as words of description rather than words of limitation as obviously the lever might be used to actuate some other indicating means.

What I claim is:

1. In a scale, the combination of a load-carrying lever, a platform stem pivotally connected thereto, a check link connected with the platform stem, an actuating lever, a link connecting the two levers having a plurality of simultaneously shiftable connections with one of the levers to change the travel of the actuating lever, and means for shifting said connection.

2. In a scale, the combination of a load-carrying lever, a platform stem pivotally connected therewith, a check link connected with the platform stem, an actuating lever, a compound link connecting the two levers, a plurality of automatic shiftable contact points between the link and one of the levers to change the throw of the actuating lever in obedience to thermal changes, and means for shifting said contact points.

3. In a scale, the combination of a load-carrying lever, a platform stem pivotally connected therewith, a check link connected with the stem, an actuating lever, and a link connecting between the two levers and having a plurality of shiftable contact points with the actuating lever to change the throw thereof, and means for automatically and simultaneously changing such contact points in obedience to thermal changes.

4. In a scale, the combination of a load-carrying lever, a platform stem pivotally connected therewith, a check link connected with the platform stem, an actuating lever, a push link between the two levers, and a plurality of shiftable knife edges supported in connection with one of the levers to change the contact points of the link with the lever to alter the throw of the actuating lever.

5. In a scale, the combination of a load-carrying lever, a platform stem pivotally connected therewith, a check link connected with the platform stem, an actuating lever, a link connecting the two levers, a shiftable knife edge on one of the levers, ball bearings for supporting said knife edge, and a thermostat for shifting the knife edge upon said ball bearings to change the throw of the lever in accordance with thermal changes.

6. In a scale, the combination of a load-carrying lever, a platform stem pivotally connected therewith, a check link connected with the platform stem, an actuating lever, a link connecting the two levers at two points, and a thermostat comprising a pair of strips having different coefficients of expansion adapted to bow or straighten in accordance with thermal changes and simultaneously move both points of contact of said link with one of the levers.

7. In a barrel scale, the combination of a load-carrying lever, a platform stem pivotally connected therewith, a check link connected with the platform stem, an actuating lever fulcrumed at the opposite side of the scale from the fulcrum point of the load-carrying lever, a double knife edge bearing for the load carrying lever to fulcrum upon, a link connecting the load-carrying lever with the actuating lever, a base for enclosing the aforementioned members, a pedestal supported upon the base, and a tare beam draft link supported at the front of the pedestal and attached to the load-carrying lever.

8. In a barrel scale, the combination of a load-carrying lever, a platform stem connected therewith, a check link connected with the platform stem, an actuating lever fulcrumed at the opposite side of the scale from the fulcrum point of the load-carrying lever and multiplying the movement communicated to it by the load-carrying lever, a link connecting the load-carrying lever and the actuating lever, a base for enclosing the aforementioned members, a pedestal located on the base, and a tare beam draft link located at the front of the pedestal and attached to the load-carrying lever intermediate the platform and the load-carrying lever fulcrum at a point where the movement of the lever is relatively small.

9. In a scale, the combination of a load-carrying lever, a platform stem pivotally connected therewith, a check link connected to the platform stem, an actuating lever, a compound link connecting the two levers and having a shiftable connection with one of the levers, a yoke having arms carrying knife edges adapted to be engaged by the compound link, and means for shifting said yoke in accordance with thermal changes.

10. In a scale, the combination of a load-carrying lever, a platform stem pivotally connected therewith, a check link connected with the platform stem, an actuating lever, a compound push link between the actuating lever and the load-carrying lever, a yoke carrying arms having knife edges on their end, said yoke being mounted shiftably upon one of the levers, a pair of strips having different coefficients of expansion secured at their ends so that differential expansion of the two strips causes a bowing or straightening action, and a connection between the middle portion of said strips and the yoke for shifting the yoke.

11. In a scale, a load-carrying lever, a support to fulcrum the same, a double knife edge bearing having aligned edges and between the support and the lever adapted to take both an upward thrust and a downward thrust, a platform, a platform stem pivoted to the load-carrying lever, and a check link pivoted to the platform stem.

12. In a scale, the combination of a load-carrying lever, a support for fulcruming the same, a double knife edge bearing between the support and the lever comprising a downwardly-directed knife edge and an aligned upwardly-directed knife edge, a platform, a platform stem pivoted to the load-carrying lever, and a check link pivoted to the said stem.

13. In a scale, the combination of a load-carrying lever, a platform stem pivotally connected therewith, a check link pivotally connected with the platform stem, a support for fulcruming the load-carrying lever, and an upwardly-facing knife edge bearing and an aligned downwardly-facing knife edge bearing between the support and the lever, and a resisting member connected to the load-carrying lever between the fulcrum and the platform stem.

14. In a scale, the combination of a load-carrying lever, a platform stem pivotally connected therewith, a check link connected to the platform stem, an actuating multiplying lever, a connection between the load-carrying lever and the actuating lever, a support for fulcruming the load-carrying lever, an upwardly-facing and a downwardly-facing knife edge bearing between the support and the load-carrying lever, and a tare or extra-capacity beam connected with the load-carrying lever between the fulcrum and the connection with the platform stem.

15. In a scale, the combination of a load-carrying lever fulcrumed at its rear end, a platform stem pivotally connected therewith, a check link connected with the stem and fulcrumed at its rear end, an actuating lever fulcrumed at the front of the machine and somewhat beyond the free ends of the check link and the load-carrying lever, and a base for the scale having a step-like housing at the front engaging over the fulcrumed portion of the actuating lever and in front of the free end of the load-carrying lever, and a link connecting the two levers.

16. In a scale, the combination of a load-carrying lever fulcrumed at the back, a check link fulcrumed at the back, a platform stem connecting the two members, an actuating lever fulcrumed at the front and somewhat ahead of the free ends of the check link and the load-carrying lever, a step-like housing engaging over the fulcrumed portion of the acuating lever to form a step in front of the load-carrying lever, a link connecting the two levers, a platform on the stem, and an apron depending from the platform adapted to engage over the sides of the higher upright portion of the base.

17. In a scale of the barrel type, the combination of an indicating drum, a pedestal, a base, a platform, a lever arrangement within the base supporting the platform, connections between the lever arrangement and the drum for operating the drum, a tare beam supported upon the front of the pedestal, and connections between the tare beam and the levers.

18. In a scale of the barrel type, the combination of a base, a pedestal, a drum rotatably supported upon the pedestal, a lever arrangement within the base including a load-carrying lever, a platform supported by the load-carrying lever, a tare beam supported on the pedestal, and a connection between the tare beam and the load-carrying lever of the lever arrangement.

19. In a drum scale of the barrel type, the combination of a base, a pedestal, a drum rotatably supported upon the pedestal, a lever arrangement within the base including a load-carrying lever supported upon a knife edge bearing having a double fulcrum with an upwardly-directed and a downwardly-directed knife edge, a platform supported upon the load-carrying lever, draft connections between the lever arrangement and the drum, a tare beam supported on the front of the pedestal, and a draft connection between the tare beam and the load-carrying lever.

20. In a scale, the combination of a pair of posts, a cross bar carried on the posts having at each end a turned-up portion carrying a V block, a second cross bar having spacers supported above the first cross bar upon the said posts and spacers, V block bearings secured on the ends of the second cross bar, and a lever provided with two arms having at their ends double knife edges inversely directed but in alignment to engage in the companion V blocks of both cross bars.

21. In a barrel scale, the combination of a load-carrying lever, a platform stem connected thereto, a check link connected to the stem, a rotatable indicating drum, a drum-actuating lever, means for connecting the drum and the drum-actuating lever, an actuating link between the load-carrying lever and the drum-actuating lever, a tare beam pivotally supported independently of the said load-carrying lever, and a draft connection between the load-carrying lever and the tare beam.

In testimony whereof I affix my signature.

BERT W. KING.